US010545495B2

(12) United States Patent
Kim et al.

(10) Patent No.: US 10,545,495 B2
(45) Date of Patent: Jan. 28, 2020

(54) REMOTE CONTROL DEVICE AND METHOD FOR UAV AND MOTION CONTROL DEVICE ATTACHED TO UAV

(71) Applicant: INDUSTRY ACADEMY COOPERATION FOUNDATION OF SEJONG UNIVERSITY, Seoul (KR)

(72) Inventors: Yong Guk Kim, Seongnam-si (KR); Sang Yun Shin, Seoul (KR); Yong Won Kang, Seoul (KR); Sang Min Park, Yangju-si (KR)

(73) Assignee: INDUSTRY ACADEMY COOPERATION FOUNDATION OF SEJONG UNIVERSITY, Seoul (KR)

( * ) Notice: Subject to any disclaimer, the term of this patent is extended or adjusted under 35 U.S.C. 154(b) by 113 days.

(21) Appl. No.: 15/857,204

(22) Filed: Dec. 28, 2017

(65) Prior Publication Data

US 2019/0187692 A1 Jun. 20, 2019

(30) Foreign Application Priority Data

Dec. 14, 2017 (KR) .......................... 10-2017-0172512
Dec. 22, 2017 (KR) .......................... 10-2017-0178178

(51) Int. Cl.
G05D 1/00 (2006.01)
G06K 9/00 (2006.01)
(Continued)

(52) U.S. Cl.
CPC ......... G05D 1/0016 (2013.01); B64C 39/024 (2013.01); G06F 3/017 (2013.01); G06K 9/00355 (2013.01); B64C 2201/146 (2013.01)

(58) Field of Classification Search
CPC ................ G05D 1/0016; B64C 39/024; B64C 2201/146; G06F 3/017; G06K 9/00355
See application file for complete search history.

(56) References Cited

U.S. PATENT DOCUMENTS

2016/0241767 A1* 8/2016 Cho .................. H04N 5/23203
2017/0277176 A1* 9/2017 Hutson ................ G05D 1/0016

FOREIGN PATENT DOCUMENTS

| KR | 1020160009291 A | 1/2016 |
| KR | 1020170035547 A | 3/2017 |
| KR | 10-1887314 B1 | 8/2018 |

OTHER PUBLICATIONS

Korean Office Action dated Apr. 3, 2018, in connection with the Korean Patent Appiication No. 10-2017-0172512 citing the above reference(s).

(Continued)

*Primary Examiner* — Aaron L Troost
(74) *Attorney, Agent, or Firm* — Hauptman Ham, LLP

(57) ABSTRACT

A remote control device and method for a UAV, and a motion control device attached to the UAV. The remote control device is carried by a user, allowing the user to remotely control motions of the UAV. A sensor unit generates sensing data by sensing a motion of the remote control device using a sensor. A control unit determines at least one among a direction of inclination of the remote control device, an angle of the direction of inclination, and a period of time for which the direction of inclination is maintained, based on the sensing data, and generating a control command for controlling a motion of the UAV using at least one among the direction of inclination, the angle of the direction of inclination, and the period of time for which the direction of inclination is maintained. A communication unit transmits the control command to the UAV.

17 Claims, 11 Drawing Sheets

(51) Int. Cl.
 G06F 3/01 (2006.01)
 B64C 39/02 (2006.01)

(56) References Cited

OTHER PUBLICATIONS

Korean Office Action dated Feb. 1, 2019, in connection with counterpart Korean Patent Application No. 10-2017-0178178, citing the above reference.

* cited by examiner

| | | | | | | | | | | | |
|---|---|---|---|---|---|---|---|---|---|---|---|
| Orientations | Up(A) | 11 | | | Down(B) | | | 12 | | | |
| | Right(C) | 6 | | | Left(D) | | | 4 | | | |
| | Forward(E) | 2 | | | Backward(F) | | | 8 | | | |
| | Forward Right(G) | 3 | | | Forward Left(H) | | | 1 | | | |
| | Backward Right(I) | 9 | | | Backward Left(J) | | | 7 | | | |
| Figures | Circle(K) | 5 | 9 | 6 | 3 | 2 | 1 | 4 | 7 | 8 | 5 | |
| | Spiral(L) | 5 | 9 | 6 | 3 | 2 | 1 | 4 | 7 | 8 | x2 | 5 |
| | Triangle(M) | 5 | 1 | 7 | 6 | 5 | | | | | | |
| | Square(N) | 5 | 2 | 4 | 8 | 6 | 5 | | | | | |
| Mode Selection | Orientations | 10 | | | 14 | | | 10 | | | |
| | Figures | 10 | | | 13 | | | 10 | | | |

<Palm Down>

① ② ③ ④ ⑤ ⑥ ⑦ ⑧ ⑨

<Palm Up>

⑩ ⑪ ⑫ ⑬ ⑭

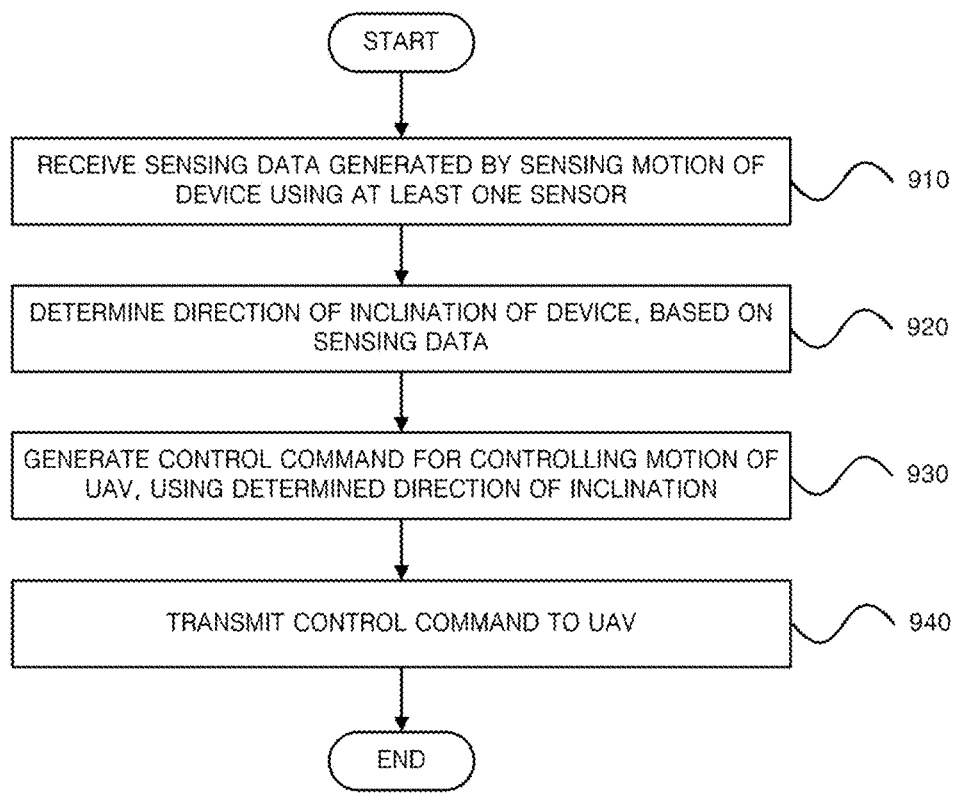

REMOTE CONTROL DEVICE AND METHOD FOR UAV AND MOTION CONTROL DEVICE ATTACHED TO UAV

CROSS REFERENCE TO RELATED APPLICATION

The present application claims priority from Korean Patent Application Number 10-2017-0172512 filed on Dec. 14, 2017, and 10-2017-0178178 filed on Dec. 22, 2017 the entire contents of which are incorporated herein for all purposes by this reference.

BACKGROUND

Field

The present invention relates to a remote control device and method for an unmanned aerial vehicle (UAV), the remote control device and method allowing a user to intuitively control the motion of a UAV, so that the UAV can move along a geometric flight path without additional equipment, and a motion control device attached to the UAV.

DESCRIPTION

An unmanned aerial vehicle (UAV), commonly known as a drone, is an aircraft without a human pilot aboard, the motion of which is remotely controlled from the ground. In general, a user controls the motion of a UAV using a dedicated radio controller (RC). However, it may be difficult to use the RC, and a novice controller cannot easily operate a UAV, which is problematic.

To solve this problem, gesture-based UAV control technology using cameras has been developed. According to this technology, however, a gesture recognition rate is significantly lowered, depending on the intensity of light used to capture images of a hand, a large amount of calculation is necessary to recognize a gesture, and it may be difficult to generalize a flight path depending on the sizes of gestures. In addition, when a UAV is controlled using geometric gestures, a depth camera must be used or an additional sensor must be provided, which may be problematic.

RELATED ART DOCUMENT

Patent Document: Korean Patent Application Publication No. 10-2017-0090603

BRIEF SUMMARY

Various aspects of the present invention provide a remote control device and method for a UAV, the remote control device and method allowing a user to intuitively control the motion of a UAV, so that the UAV can move along a geometric flight path without additional equipment, and a motion control device attached to the UAV.

Other objects of the present invention will be clearly understood by a person having ordinary skill in the art from embodiments described hereinafter.

According to an aspect, provided is a remote control device carried by a user, allowing the user to remotely control a motion of an unmanned aerial vehicle. The remote control device may include: a sensor unit generating sensing data by sensing a motion of the remote control device using at least one sensor; a control unit determining a direction of inclination of the remote control device, based on the sensing data, and generating a control command for controlling a motion of an unmanned aerial vehicle using the determined direction of inclination; and a communication unit transmitting the control command to the unmanned aerial vehicle. The determined direction of inclination is one direction of inclination among a plurality of predetermined directions of inclination.

The plurality of directions of inclination may include x number of directions of inclination categorized as a state in which a top surface of the remote control device faces upwardly, where x is an integer equal to or greater than 2, and y number of directions of inclination categorized as a state in which the bottom surface of the remote control device 300 faces upwardly, where y is an integer equal to or greater than 2.

When the top surface of the remote control device is included of x number of areas that are divided from each other without overlapping, the x number of directions of inclination may correspond to directions in which the remote control device is inclined upwardly or downwardly of the x number of areas. When the bottom surface of the remote control device is included of y number of areas that are divided from each other without overlapping, the y number of directions of inclination may correspond to directions in which the remote control device is inclined upwardly or downwardly of the y number of areas.

The control unit may calculate a direction group of inclination of the remote control device using the sensing data, and generates a control command by further using the determined direction group of inclination. The determined direction group of inclination may be one direction group of inclination among a plurality of predetermined direction groups of inclination. The plurality of predetermined direction groups of inclination may include a first direction group of inclination with respect to a forward direction, a second direction group of inclination with respect to a backward direction, a third direction group of inclination with respect to left, and a fourth direction group of inclination with respect to right.

The x number of directions of inclination may include a plurality of directions of inclination with respect to the forward direction, a plurality of directions of inclination with respect to the backward direction, a plurality of directions of inclination with respect to the left, and a plurality of directions of inclination with respect to the right. The first direction group of inclination may be obtained by grouping the plurality of directions of inclination with respect to the forward direction, the second direction group of inclination may be obtained by grouping the plurality of directions of inclination respect to the backward direction, the third direction group of inclination may be obtained by grouping the plurality of directions of inclination with respect to the left, and the fourth direction group of inclination may be obtained by grouping the plurality of directions of inclination respect to the right.

The control unit may determine the direction of inclination of the remote control device using a first neural network having the sensing data as an input, and may generate the control command using the determined direction of inclination and a second neural network having the determined direction group of inclination as an input.

The control command may include a first mode control command for controlling a direction of movement of an unmanned aerial vehicle and a second mode control command for controlling the unmanned aerial vehicle to move along a predetermined geometric flight path.

The control unit may perform a mode change using at least one direction of inclination among the plurality of directions of inclination, and in response to the mode change, generate one mode control command of the first mode control command and the second mode control command.

The first mode control command may include an ascending command, a descending command, a right movement command, a left movement command, a forward movement command, a backward movement command, a forward-right movement command, a forward-left movement command, a backward-right movement command, and a backward-left movement command. The second mode control command may include a circular movement command, a spiral movement command, a triangular movement command, and a quadrangular movement command.

After the mode change to the second mode, when directions of inclination corresponding to adjacent areas, among x number of directions of inclination, are determined sequentially from a reference position, where x is an integer equal to or greater than 2, the control unit may generate a control command for controlling the unmanned aerial vehicle to move along the geometric flight path.

The control unit may determine a scale of the geometric flight path using a period of time for returning to the reference position after the directions of inclination corresponding to the adjacent areas are determined sequentially from the reference position.

The reference position may be defined as a direction of inclination corresponding to a horizontal position in a state in which the top surface of the remote control device faces upwardly.

The sensing data may be roll data, pitch data, and z-axis gravity data regarding the motion of the remote control device.

The control unit may determine at least one of an angle of the direction of inclination and a period of time for which the direction of inclination is maintained, based on the sensing data, and determine a speed of movement of the unmanned aerial vehicle using at least one of the angle of the direction of inclination and the period of time for which the direction of inclination is maintained.

According to another aspect, provided is a remote control device carried by a user, allowing the user to remotely control a motion of an unmanned aerial vehicle. The remote control device may include: a sensor unit generating sensing data by sensing a motion of the remote control device using at least one sensor; a control unit determining at least one among a direction of inclination of the remote control device, an angle of the direction of inclination, and a period of time for which the direction of inclination is maintained, based on the sensing data, and generating a control command for controlling a motion of an unmanned aerial vehicle using at least one among the direction of inclination, the angle of the direction of inclination, and the period of time for which the direction of inclination is maintained; and a communication unit transmitting the control command to the unmanned aerial vehicle.

According to a further aspect, provided is a remote control method performed by a device carried by a user and including a processor. The remote control method may include: receiving sensing data generated by sensing a motion of the remote control device using at least one sensor; determining a direction of inclination of the remote control device, based on the sensing data; generating a control command for control a motion of an unmanned aerial vehicle using the determined direction of inclination; and transmitting the control command to the unmanned aerial vehicle. The determined direction of inclination is one direction of inclination among a plurality of predetermined directions of inclination.

According to another aspect, a motion control device attached to an unmanned aerial vehicle may include: a communication unit receiving a control command for controlling a motion of an unmanned aerial vehicle from a remote control device carried by a user; and a controller controlling the motion of the unmanned aerial vehicle based on the control command. The control command is generated based on a direction of inclination of the remote control device, the direction of inclination of the remote control device being determined using sensing data obtained using at least one sensor provided on the remote control device, and the determined direction of inclination being one direction of inclination among a plurality of predetermined directions of inclination.

According to the present invention as set forth above, it is possible to intuitively control the motion of a UAV so that the UAV can move along a geometric flight path without additional equipment.

The effects of the present invention are not limited to those described above and other effects, not stated herein, may be apparent to a person having ordinary skill in the art from reference to the claims.

BRIEF DESCRIPTION OF THE DRAWINGS

The above and other objects, features and advantages of the present disclosure will be more clearly understood from the following detailed description when taken in conjunction with the accompanying drawings, in which:

FIG. 9 illustrates a flowchart of a remote control method for a UAV according to an embodiment of the present invention.

DETAILED DESCRIPTION

A singular representation may include a plural representation as far as it represents a definitely different meaning from the context. Terms, such as "include" and "has," used herein should be understood that they are intended to indicate an existence of several components or several steps, disclosed in the specification, and it may also be understood that part of the components or steps may not be included or additional components or steps may further be included. In the following description, terms, such as "unit" and "module," indicate a unit for processing at least one function or operation, wherein the unit and the block may be embodied as hardware or software or embodied by combining hardware and software.

Hereinafter, a variety of embodiments of the present invention will be described in detail with reference to the accompanying drawings.

Figure 1:
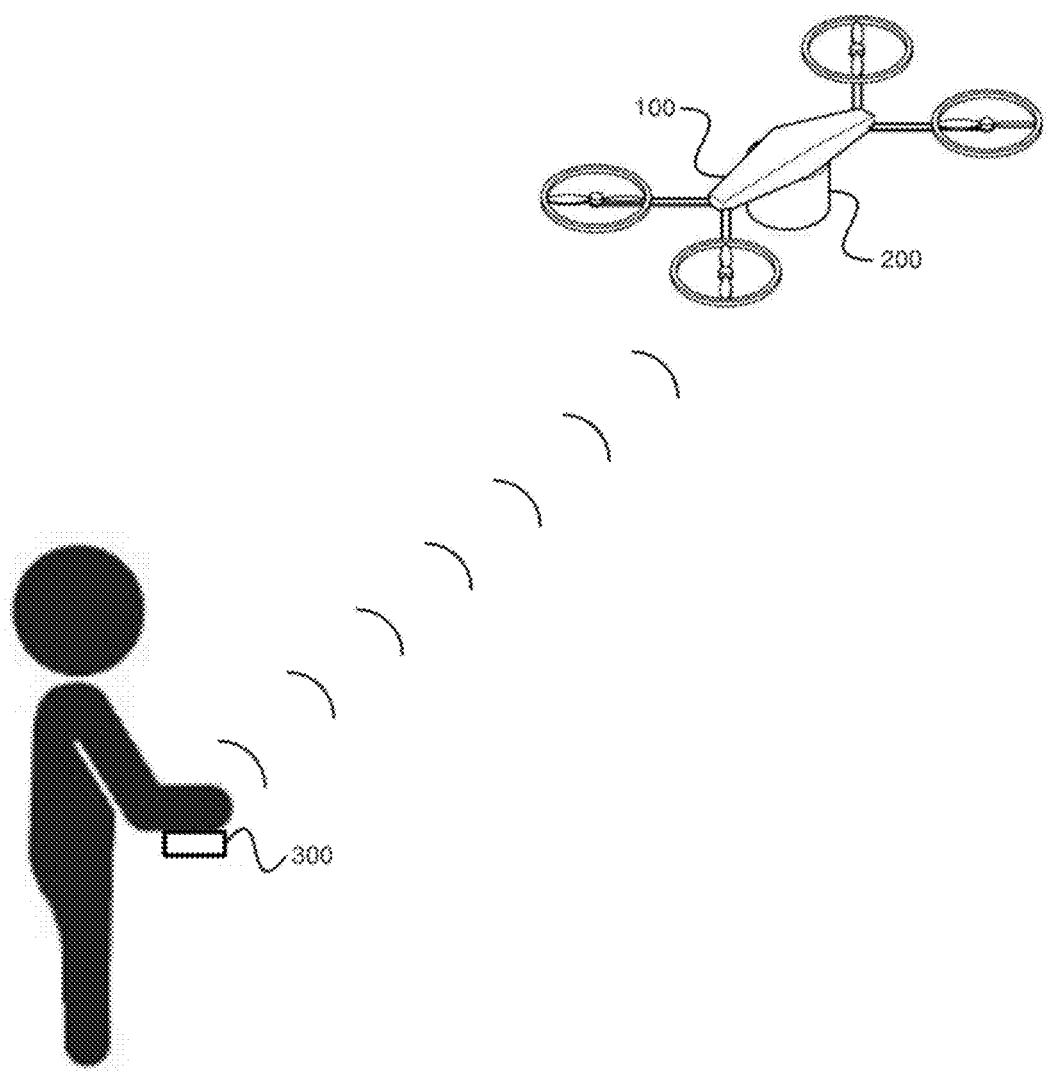
FIG. 1 illustrates a schematic configuration of a UAV according to an embodiment of the present invention.

FIG. 1 illustrates a schematic configuration of a UAV according to an embodiment of the present invention.

Referring to FIG. 1, the UAV according to an embodiment of the present invention includes a UAV 100, a motion control device 200, and a remote control device 300. Hereinafter, respective components will be described in detail with regard to the functions thereof. Hereinafter, respective components and the functions thereof will be described in detail.

The UAV 100 means an aircraft without a human pilot aboard, the motion of which can be remotely controlled from the ground. In FIG. 1, a quadrotor, a drone having four rotors, is illustrated as an example of the UAV 100. However, the present invention is not limited thereto but the UAV 100 according to the present invention may be embodied in a variety of forms.

The motion control device 200 is attached to one surface, for example, the bottom of the UAV 100. The motion control device 200 is a device for controlling the motion of the UAV 100. The motion control device 200 may control the motion of the UAV 100 based on a control command transmitted by the remote control device 300.

Figure 2:
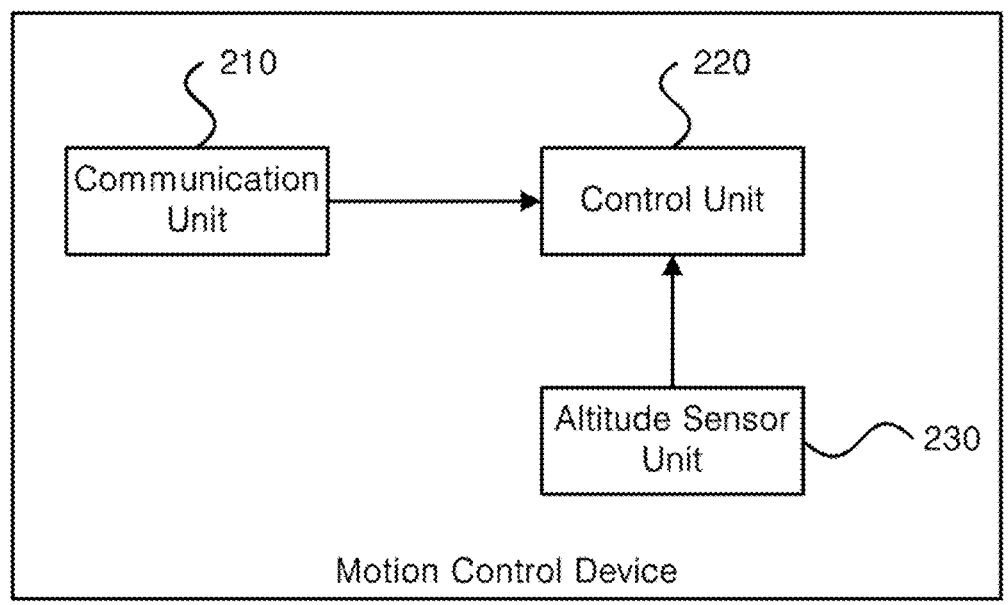
FIG. 2 illustrates a schematic configuration of the motion control device according to an embodiment of the present invention.

FIG. 2 illustrates a schematic configuration of the motion control device 200 according to an embodiment of the present invention.

Referring to FIG. 2, the motion control device 200 according to an embodiment of the present invention includes a communication unit 210, an altitude sensor unit 220, and a control unit 230.

The communication unit 210 receives a control command transmitted by the remote control device 300. The communication unit 210 may perform communications using a short-range communications module, such as Wi-Fi, a long-range communications module, such as a radio frequency (RF) module. The received control command will be described in more detail later.

The altitude sensor unit 220 measures the altitude of the UAV 100, which is necessary for takeoff or hovering. For example, the altitude sensor unit 220 may be LeddarOne.

In general, the hovering of the UAV 100 may be performed by controlling the throttle value of a motor; however, when an altitude sensor is not used, a small change in the throttle value may cause a significant change in the altitude. Although an ultrasonic sensor has been used in the related art, it is difficult to accurately measure the altitude, since diffuse reflection may occur when the ground surface is not flat. Thus, the present invention can reliably control the takeoff or hovering using LeddarOne as the altitude sensor unit 220.

The control unit 230 calculates a control value for controlling the motion of the UAV 100 based on the control command received by the communication unit 210 and the altitude value measured by the altitude sensor unit 220.

According to an embodiment of the present invention, the control unit 230 may include Raspberry Pi and Pixhack. Raspberry Pi is a microcomputer outputting a control valve by receiving the control command received by the communication unit 210. In addition, Pixhack is a flight controller including an accelerometer, a magnetometer, and a gyroscope (9-axis sensor).

The control command, as well as a sensing value sensed by LeddarOne, may be a quaternion value, while the control value may be an Euler angle value. Pixhack may control the motion of the UAV 100 based on Euler angle values. The relationship between the quaternion value and the Euler angle value is represented by Formulas 1 and 2:

$$\begin{bmatrix} \phi \\ \theta \\ \psi \end{bmatrix} = \begin{bmatrix} \arctan\frac{2(q_0 q_1 + q_2 q_3)}{1 - 2(q_1^2 + q_2^2)} \\ \arcsin(2(q_0 q_2 - q_3 q_1)) \\ \arctan\frac{2(q_0 q_3 + q_1 q_2)}{1 - 2(q_2^2 + q_3^2)} \end{bmatrix} \quad (1)$$

$$\begin{bmatrix} q_0 \\ q_1 \\ q_2 \\ q_3 \end{bmatrix} = \begin{bmatrix} \cos(\psi/2) \\ 0 \\ 0 \\ \sin(\psi/2) \end{bmatrix} \begin{bmatrix} \cos(\theta/2) \\ 0 \\ \sin(\theta/2) \\ 0 \end{bmatrix} \begin{bmatrix} \cos(\phi/2) \\ \sin(\phi/2) \\ 0 \\ 0 \end{bmatrix} = \quad (2)$$

$$\begin{bmatrix} \cos(\phi/2)\cos(\theta/2)\cos(\psi/2) + \sin(\phi/2)\sin(\theta/2)\sin(\psi/2) \\ \sin(\phi/2)\cos(\theta/2)\cos(\psi/2) - \cos(\phi/2)\sin(\theta/2)\sin(\psi/2) \\ \cos(\phi/2)\sin(\theta/2)\cos(\psi/2) + \sin(\phi/2)\cos(\theta/2)\sin(\psi/2) \\ \sin(\phi/2)\cos(\theta/2)\sin(\psi/2) - \sin(\phi/2)\sin(\theta/2)\cos(\psi/2) \end{bmatrix}$$

In Formulas 1 and 2, elements in the function $\{\varphi, \theta, \psi\}$ indicate roll data, pitch data, and yaw data, respectively, and elements in the function $q=\{q_0, q_1, q_2, q_3\}$ indicate four elements of a quaternion.

Returning to FIG. 1, the remote control device 300 is a device for remotely controlling the motion of the UAV 100. The remote control device 300 generates a control command for controlling the motion of the UAV 100, as described above, and transmits the control command to the motion control device 200.

Figure 3:
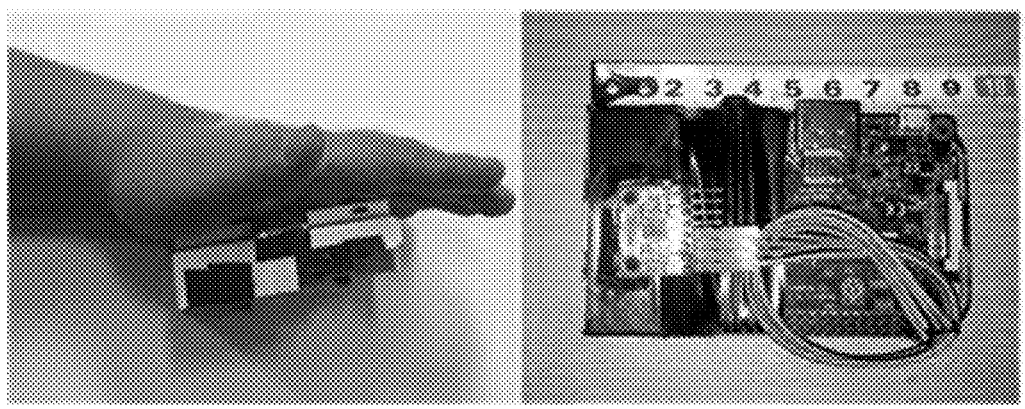
FIGS. 3A and 3B illustrate the shape and size of a prototype of the remote control device, attached to the palm of the user.

The remote control device 300 may be carried by (e.g. held by or attached to) a user. For example, the remote control device 300 may be attached to a hand, in particular, to the palm, of the user. FIGS. 3A and 3B illustrate the shape and size of a prototype of the remote control device 300, attached to the palm of the user.

Hereinafter, for convenience of description, the remote control device 300 will be described as being attached to the palm of the user, as illustrated in FIG. 3A. Specifically, the remote control device 300 will be described that the top surface thereof is in contact with the palm of the user and the bottom surface thereof faces toward the ground.

The remote control device 300 may generate a control command for controlling the motion of the UAV 100 by measuring the pose of the hand of the user using at least one sensor. More particularly, the remote control device 300 may generate the control command based on the pose of the remote control device 300 attached to the hand of the user.

Figure 4:
FIGS. 4A to 4D illustrate an exemplary operation of controlling a UAV using the remote control device according to an embodiment of the present invention.
Figure 4:
Figure 4:
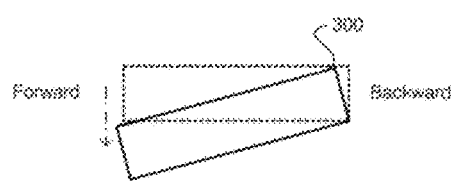
Figure 4:
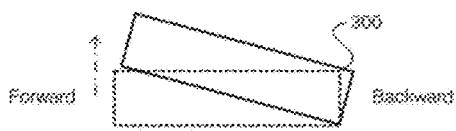
Figure 4:
Figure 4:
Figure 4:
Figure 4:
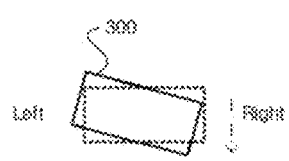

In an example, as illustrated in FIG. 4A, when the fingers of the hand of the user are inclined forwardly, with the remote control device 300 being attached to the palm of the hand of the user, the front portion of the remote control device 300 may be inclined forwardly, thereby causing the UAV 100 to move forwardly.

In another example, as illustrated in FIG. 4B, when the fingers of the hand of the user are inclined upwardly, with the remote control device 300 being attached to the palm of the hand of the user, the rear portion of the remote control device 300 is inclined downwardly, thereby causing the UAV 100 to move backwardly.

In a further embodiment, as illustrated in FIG. 4C, when the hand of the user are twisted to the left, with the remote control device 300 being attached to the palm of the hand of the user, the remote control device 300 is inclined to the left, thereby causing the UAV 100 to move to the left.

In another embodiment, as illustrated in FIG. 4D, when the hand of the user are twisted to the right, with the remote control device 300 being attached to the palm of the hand of the user, the remote control device 300 is inclined to the right, thereby causing the UAV 100 to move to the right.

Hereinafter, the remote control device 300 according to an embodiment of the present invention will be described in more detail with reference to FIG. 5.

Figure 5:
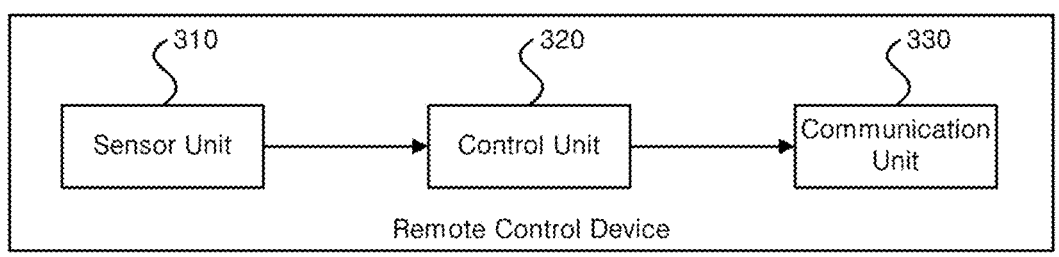
FIG. 5 illustrates a schematic configuration of the remote control device according to an embodiment of the present invention.

FIG. 5 illustrates a schematic configuration of the remote control device 300 according to an embodiment of the present invention.

Referring to FIG. 5, the remote control device 300 includes a sensor unit 310, a control unit 320, and a communication unit 330. The remote control device 300 may be implemented as a smartphone including both a processor and a communication module. Hereinafter, respective components and the functions thereof will be described in detail.

The sensor unit 310 generates sensing data by sensing the motion (pose) of the hand of the user, in particular, the motion of the remote control device 300 attached to the hand of the user. In this regard, the sensor unit 310 includes at least one sensor. For example, the sensor unit 310 may be MPU-6050, i.e. a 6-axis sensor including a gyroscope and an accelerometer.

However, the sensor unit 310 according to the present embodiment is not limited to the 6-axis sensor but may be a 9-axis sensor including an accelerometer, a magnetometer, and a gyroscope.

Although the sensor unit 310 will be mainly described hereinafter as being a 6-axis sensor, the sensor unit 310 will also be described as being a 9-axis sensor, such that the sensor unit can control not only the direction of the motion but also the speed of the motion.

According to an embodiment of the present invention, the sensing data may be roll data, pitch data, and z-axis gravity data regarding the motion of the remote control device 300.

The control unit 320 generates a control command for controlling the motion of the UAV 100 based on the sensing data. For example, the control unit 320 may include Raspberry Pi. In addition, the communication unit 330 transmits the generated control command to the motion control device 200.

According to an embodiment of the present invention, the control unit 320 may determine the direction of inclination (or the direction of twisting) of the remote control device 300 using the sensing data, and may generate a control command for controlling the motion of the UAV 100 based on the determined direction of inclination. A plurality of directions of inclination may be used to define poses of the remote control device 300 and to indicate directions in which the remote control device 300 is inclined or twisted. This is the same as described above with reference to FIG. 3.

The determined direction of inclination may be one of the plurality of predetermined directions of inclination. According to the present invention, the plurality of directions of inclination may be matched to the sensing data, respectively, via learning on the sensing data. In the use of the remote control device 300, when one sensing data is generated, the control unit 210 may determine a direction of inclination, among the plurality of directions of inclination set during learning, to which the generated sensing data correspond.

The plurality of directions of inclination may include x number of directions of inclination A (where x is an integer equal to or greater than 2) categorized as a state in which the top surface of the remote control device 300 faces upwardly (i.e. the back of the hand of the user faces upwardly) and y number of directions of inclination B (where y is an integer equal to or greater than 2) categorized as a state in which the bottom surface of the remote control device 300 faces upwardly (i.e. the palm of the hand of the user faces upwardly).

When the top surface of the remote control device 300 is comprised of x number of areas that are divided from each other without overlapping, the x number of directions of inclination A correspond to the directions in which the remote control device 300 is inclined upwardly or downwardly of the x number of areas. In addition, when the bottom surface of the remote control device 300 is comprised of y number of areas that are divided from each other without overlapping, the y number of directions of inclination B correspond to the directions in which the remote control device 300 is inclined upwardly or downwardly of the y number of areas. According to another embodiment of the present invention, the control unit 320 may calculate a direction group of inclination of the remote control device 300 based on the sensing data, and may generate a control command by further using the determined direction group of inclination together with the direction of inclination of the remote control device 300. The direction group of inclination is obtained by grouping two or more directions of inclination among the plurality of directions of inclination, and like the direction of inclination, is used to determining the direction in which the remote control device 300 is inclined.

That is, the direction groups of inclination are used to determine a direction of inclination intended by the user, rather than a more accurate direction of inclination. This is used to reduce noise and generate an accurate control command.

The determined direction groups of inclination may be one direction group of inclination among the plurality of predetermined direction groups of inclination. According to the present invention, the plurality of direction groups of inclination may be matched to the sensing data, respectively, via learning on the sensing data. In the use of the remote control device 300, when one sensing data is generated, the control unit 210 may determine a direction group of inclination, among the plurality of direction groups of inclination set during learning, to which the generated sensing data correspond.

Hereinafter, the directions of inclination and the direction groups of inclination will be described in more detail with reference to FIGS. 6A to 6C.

Figure 6A:
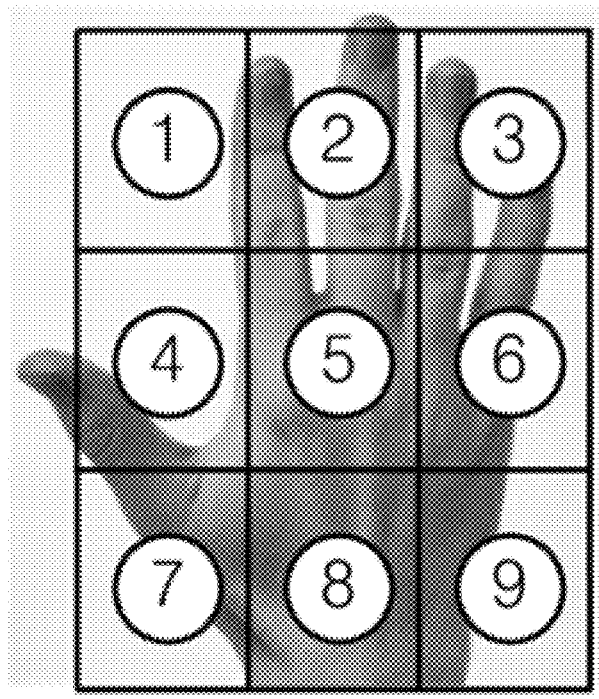
FIGS. 6A to 6C illustrate a plurality of hand pose areas according to an embodiment of the present invention.
Figure 6B:
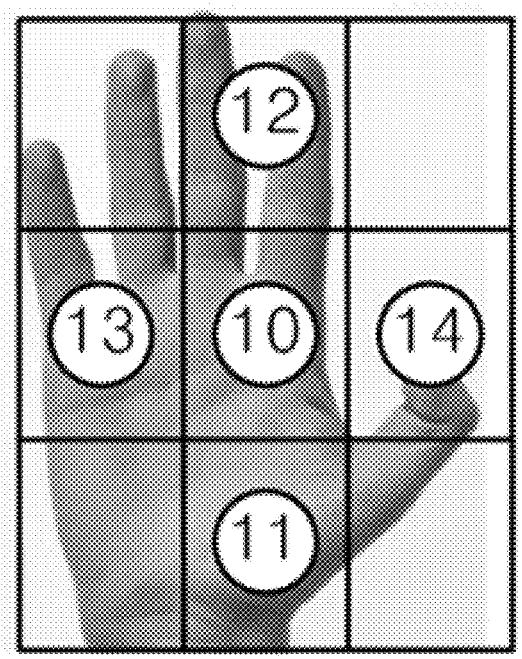
Figure 6C:
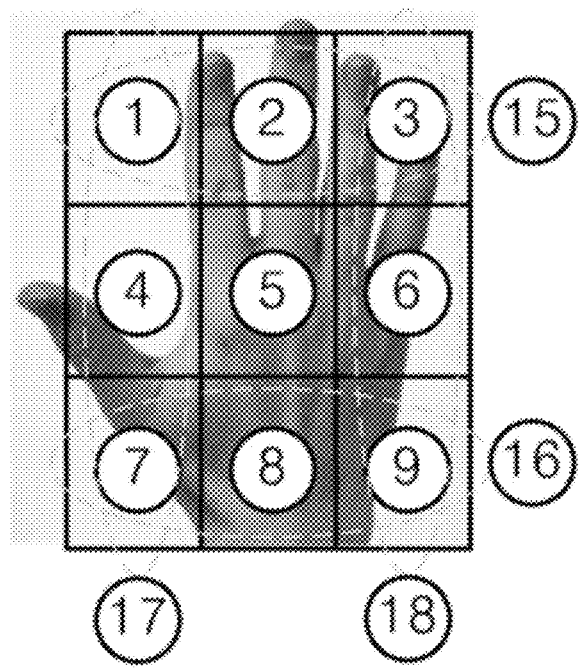

FIGS. 6A to 6C illustrate an example of hand pose areas for defining a plurality of hand poses according to an embodiment of the present invention, by which directions of inclination and direction groups of inclination are determined.

Here, the hand of the user corresponds to the remote control device 300, the back of the hand of the user (FIG. 6A) corresponds to the top surface of the remote control device 300, and the palm of the hand of the user (FIG. 6B) corresponds to the bottom surface of the remote control device 300. Hereinafter, for convenience of description, the top surface of the remote control device 300 will be assumed to be the back of the hand, and the bottom surface of the remote control device 300 will be assumed to be the palm of the hand.

First, referring to FIG. 6A, the back of the hand of the user is divided into nine areas that do not overlap each other, thereby forming a 3×3 matrix. All of the nine areas are used to define nine directions of inclination A. The nine directions of inclination A correspond to the directions in which the back of the hand is inclined downwardly of the nine areas (i.e. the nine areas A), respectively. For example, one direction matched to area ①, among the nine directions of inclination A, corresponds to a position in which the back of the hand of the user is inclined in the direction of area ①. The nine directions of inclination A may be defined as directions in which the nine areas are inclined upwardly, respectively.

Here, x number of areas include a direction corresponding to a position in which the remote control device 300 remains horizontal (⑤, the direction of inclination 0).

Next, referring to FIG. 6B, the palm of the hand of the user is divided into nine areas that do not overlap each other, thereby forming a 3×3 matrix. Five areas of the nine areas are used to define five directions of inclination B.

The five directions of inclination B correspond to the directions in which the palm of the hand is inclined downwardly in the five areas of the nine areas (i.e. the five areas B). The five directions of inclination B may also be defined as directions in which the five areas are inclined upwardly, respectively.

Likewise, y number of areas include a direction corresponding to a position in which the remote control device 300 remains horizontal (⑩ in which an angle of inclination is 0°).

FIG. 6C illustrates four direction groups of inclination. Referring to FIG. 6C, the four direction groups of inclination may be defined based on the nine areas A of the back of the hand of the user, as described with reference to FIG. 6A. The four direction groups include a first direction group of inclination ⑮ with respect to the forward direction, a second direction group of inclination ⑯ with respect to the backward direction, a third direction group of inclination ⑰ with respect to the left, and a fourth direction group of inclination ⑱ with respect to the right.

The first direction group of inclination includes three directions of inclination A, corresponding to three areas in the forward direction among the nine areas, i.e. areas ①, ②, and ③. The second direction group of inclination includes three directions of inclination A, corresponding to three areas in the backward direction among the nine areas, i.e. areas ⑦, ⑧, and ⑨. The third direction group of inclination includes three directions of inclination A, corresponding to three areas in the left among the nine areas, i.e. areas ①, ④, and ⑦. The fourth direction group of inclination includes three directions of inclination A, corresponding to three areas in the right among the nine areas, i.e. areas ③, ⑥, and ⑨.

Generalizing the concept of FIG. 6C, the x number of directions of inclination A according to the top surface of the remote control device 300 include a plurality of directions of inclination A1 with respect to the forward direction, a plurality of directions of inclination A2 with respect to the backward direction, a plurality of directions of inclination A3 with respect to the left, and a plurality of directions of inclination A4 with respect to the right. The first direction group of inclination is obtained by grouping the plurality of directions of inclination A1, the second direction group of inclination is obtained by grouping the plurality of directions of inclination A2, the third direction group of inclination is obtained by grouping the plurality of directions of inclination A3, and the fourth direction group of inclination is obtained by grouping the plurality of directions of inclination A4.

When the remote control device 300 is manipulated in a position attached to (held by) the hand of the user, slight shaking may be caused by the motion of the user.

For example, when the user downwardly inclines the front portion of the remote control device 300 in order to control the UAV 100 to move forwardly, slight shaking may be caused. However, when sensing data corresponding to the plurality of directions of inclination with respect to the forward direction are input for a predetermined period of time, it is possible to reliably control the UAV 100 using the direction groups of inclination so that the UAV 100 can move forwardly without shaking.

The operation of the remote control device 300 according to an embodiment of the present invention will be described in more detail with reference to the foregoing description and FIG. 7.

Figure 7:
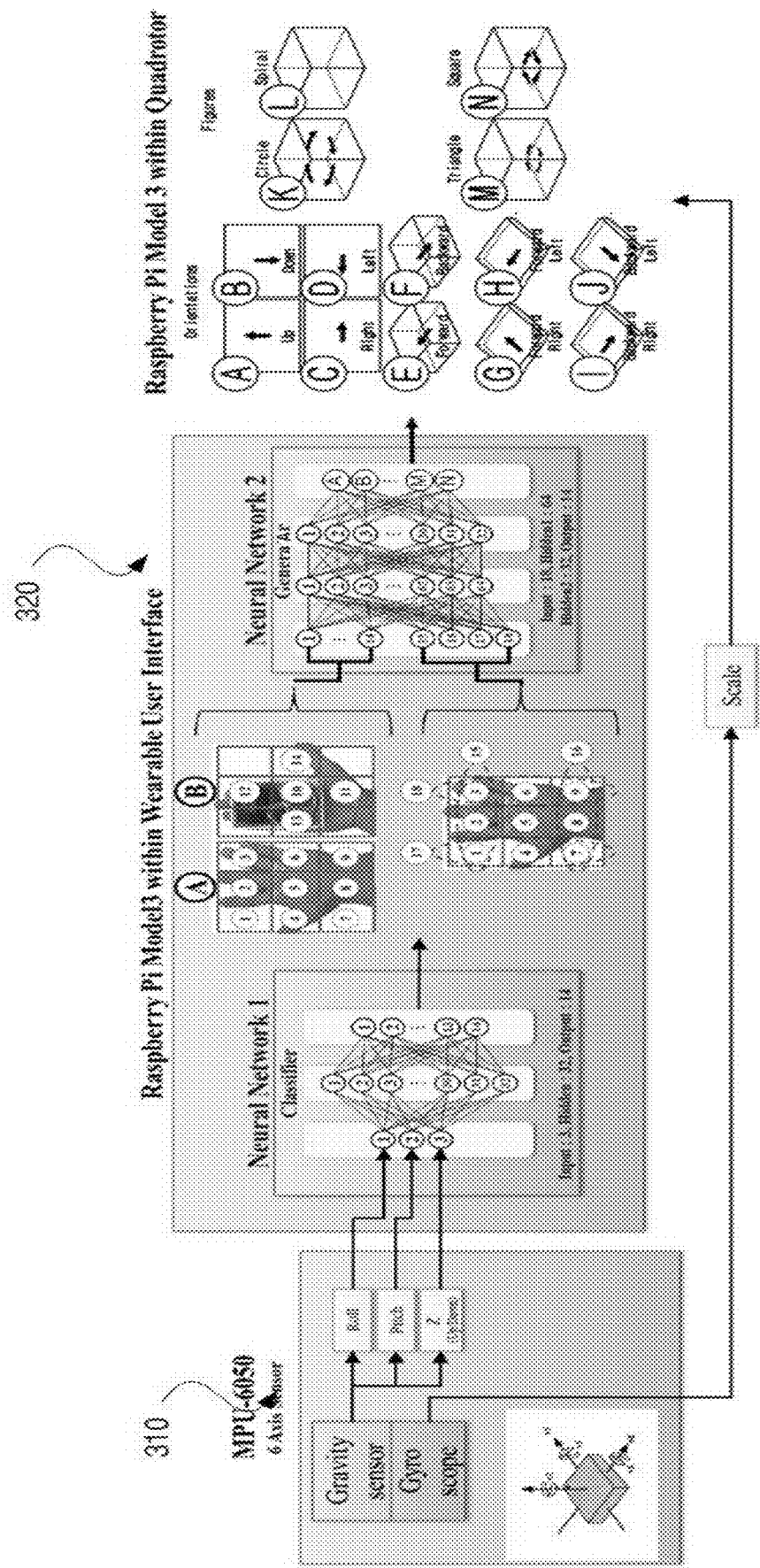
FIG. 7 illustrates a concept of the operation of the remote control device according to an embodiment of the present invention.

FIG. 7 illustrates a concept of the operation of the remote control device 300 according to an embodiment of the present invention. The assumption, discussed above with reference to FIGS. 6A to 6C, may also be applied to FIG. 7.

The sensor unit 310 generates roll data, pitch data, and z-axis gravity data regarding the hand of the user by sensing the motion of the hand of the user, and transmits the generated data to the control unit 320. The sensor unit 310 continuously senses the roll data, the pitch data, and the z-axis gravity data.

The control unit 320 generates a control command by receiving the roll data, the pitch data, and the z-axis gravity data, which are continuously sensed. In this regard, the control unit 320 includes a first neural network Neural Network 1 and a second neural network Neural Network 2.

More specifically, returning to FIGS. 6A to 6C, the first neural network is comprised of three input data, thirty-two hidden data, and fourteen output data. The first neural network receives the roll data, the pitch data, and the z-axis gravity data, which are continuously sensed, outputs probability values of fourteen areas, and thereby, determines one direction of inclination among fourteen directions of inclination.

For example, the first neural network outputs the probability values of the fourteen areas, based on the continuously-input sensing data. When the probability value of area ① among the fourteen areas is the maximum, the first neural network determines the remote control device 300 to be inclined in a direction of inclination, corresponding to area ①, among the fourteen directions of inclination.

In addition, the second neural network is comprised of eighteen input data, sixty-four first hidden data, thirty-two hidden data, and fourteen output data.

Fourteen input data among the eighteen input data correspond to the above-determined directions of inclination. For example, when the determined direction of inclination corresponds to area ①, the value of first input data among the fourteen input data may be "1," while the value of second to fourteenth input data among the fourteen input data may be "0."

In addition, the remaining four input data among the fourteen input data are input, including the four direction groups of inclination. In this case, one direction group of inclination is determined among the four direction groups of inclination, based on the continuously-input sensing data, and then is input to the second neural network. For example, when the determined direction group of inclination is the first direction group of inclination, the input value of the fifteenth input data may be "1," and the input value of the eighteenth input data may be "0."

In addition, the determination of the direction group of inclination of the control unit 320 will now be described by way of example.

In an example, among the continuously-input sensing data, a majority of the sensing data may be distributed in area ①, a little amount of sensing data may be distributed in areas ② and ③, and no sensing data may be distributed in the remaining areas. In this case, it is determined that the remote control device 300 is inclined in the first direction group of inclination corresponding to the forward direction, among the four direction groups of inclination.

In another example, the continuously-input sensing data may be uniformly distributed in areas ①, ④, and ⑦, and no sensing data may be distributed in the remaining areas. In this case, it is determined that the remote control device 300 is inclined in the third direction group of inclination corresponding to the left, among the four direction groups of inclination.

In addition, the second neural network generates a control command via the fourteen output data. The control command may include a first mode control command for controlling the direction of the movement of the UAV 100 and a second mode control command for controlling the UAV 100 to move along a predetermined geometric flight path.

The first mode control command may include an ascending command Up, a descending command Down, a right movement command Right, a left movement command Left, a forward movement command Forward, a backward movement command Backward, a forward-right movement command Forward-Right, a forward-left movement command Forward-Left, a backward-right movement command Backward-Right, and a backward-left movement command Backward-Left. In addition, the second mode control command may include a circular movement command Circle, a spiral movement command Spiral, a triangular movement command Triangle, and a quadrangular movement command Square.

Figure 8:
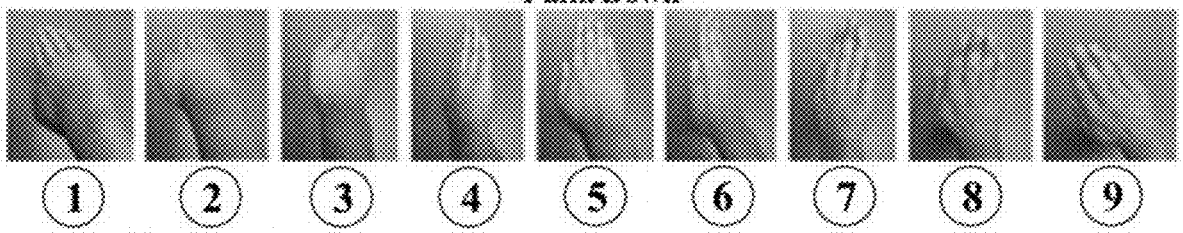
FIG. 8 illustrates exemplary poses of a hand used to generate geometric flight path commands.
Figure 8:
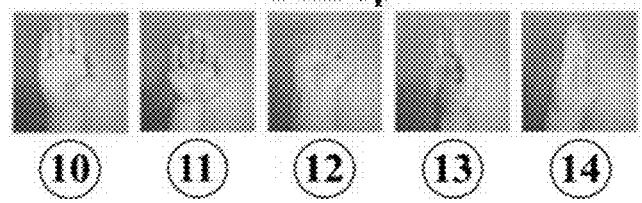

The above-described control commands are merely illustrative and may be defined in a variety of other forms. FIG. 8 illustrates exemplary poses of a hand used to generate geometric flight path commands.

The control unit 320 may perform a mode change using at least one direction of inclination among the fourteen directions of inclination. The control unit 320 may generate one mode control command of the first mode control command and the second mode control command, in response to the mode change. For example, when the remote control device 300 is inclined in a direction of inclination corresponding to area ⑬, the control unit 320 may be changed to the first mode. When the remote control device 300 is inclined in a direction of inclination corresponding to area ⑭, the control unit 320 may be changed to the second mode.

In addition, when the UAV 100 moves along a geometric flight path, the remote control device 300 may adjust the size of the flight path (such that the flight path is, for example, to be a smaller circle, a middle circle, and a larger circle). In this regard, the remote control device 300 may use a scale factor. That is, the control unit 320 may calculate a scale factor, based on sensing data sensed by the gyroscope of the sensor unit 310 and a period of time for generating a hand gesture. The scale factor may be expressed by Formula 3:

$$S=(\alpha \Sigma G)+(1-\alpha)(T) \qquad (3),$$

where S indicates a scale factor, G indicates a cumulative value, T indicates a period of time for drawing a hand gesture, and α indicates a constant fixed as 0.1.

According to an embodiment of the present invention, the geometric flight path control process of the UAV 100 may be performed after the change to the second mode is undertaken, in a position in which the top surface of the remote control device 300 faces upwardly.

For example, the scale may be adjusted using a period of time for returning to area ⑤, i.e. a horizontal position (reference position), is performed after sensing data are sequentially input into the adjacent areas corresponding thereto among the nine areas in FIG. 6A, for example, in the sequence of areas ⑤, ①, ②, ③, ⑥, ⑨, ⑧, ⑦, and ④.

When the period of time for returning to the horizontal position is longer, the UAV 100 is controlled to move along a greater path.

As described above, the motion of the UAV 100 is controlled by determining the direction of inclination of the remote control device 300.

The control unit 230 according to an exemplary embodiment of the present invention may determine the speed of movement using a period of time for which the direction of inclination determined based on the sensing data is maintained.

When the direction of inclination of one area among the nine areas in FIG. 6A is determined, the control unit 230 determines a period of time for which the determined direction of inclination is to be maintained.

The speed of the UAV 100 according to the present embodiment may be comprised of a plurality of speeds sections. The UAV 100 may be determined to move at a speed corresponding to a specific speed section among the plurality of speed sections.

For example, after a period of time T1 has been maintained since the determination of one direction of inclination, the UAV 100 may move at a speed V1 in a direction of movement corresponding to the determined direction of inclination. Afterwards, when the direction of inclination is maintained for a period of time T2, the UAV 100 may move at a speed V2 corresponding to the period of time T1 or T2.

Here, V2 is a speed faster than V1.

According to the present embodiment, the speed of movement of the UAV 100 may be controlled using an angle in the direction of inclination.

The angle in the direction of inclination may be determined when a nine-axis sensor is used instead of a six-axis sensor.

In addition, according to an exemplary embodiment of the present invention, when the flight of the UAV 100 along a geometric path has been completed, the direction indicated by the front portion of the UAV 100 may differ from the direction at an initial point in time of the flight along the geometric path.

In this regard, the control unit 230 according to the present embodiment stores the position of the UAV 100 at a point in time at which a change to the second mode was undertaken (the initial point in time).

The position at the initial point in time may be information regarding the direction indicated by the front portion of the UAV 100.

Afterwards, when the position after the geometric flight path differs from the position at the initial point in time, the control unit 230 may generate a control command to correct the position of the UAV 100.

Since the motion of the UAV 100 is controlled using the remote control device 300 attached to the hand of the user, it is possible to intuitively control the motion of the UAV 100. In addition, it is possible to control the UAV 100 to move along a geometric flight path without additional equipment.

FIG. 9 illustrates a flowchart of a remote control method for a UAV according to an embodiment of the present invention. The remote control method may be performed by a device carried by the user and including a processor. Hereinafter, respective steps and respective operations performed in the steps will be described.

In step 910, sensing data generated by sensing a motion of the device using at least one sensor is input.

In step 920, a direction of inclination of the device is determined based on the sensing data.

In step 930, a control command for controlling the motion of the UAV is generated based on the determined direction of inclination.

In step 940, the generated control command is transmitted to the UAV.

According to an embodiment of the present invention, in step 920, a direction group of inclination may be further calculated based on the sensing data, and in step 930, the control command may be generated further using the calculated direction group of inclination.

The remote control method for a UAV, according to embodiments of the present invention, has been described so far. The configuration of the remote control device 300, described earlier with reference to FIGS. 1 to 8, may be applied to the remote control method, and specific descriptions thereof will be omitted.

Methods according to embodiments of the present disclosure may be implemented in the form of program instructions executable through diverse computing means and may be recorded in computer readable media. The computer readable media may include independently or associatively program instructions, data files, data structures, and so on. Program instructions recorded in the media may be specially designed and configured for the present invention, or may be generally known by those skilled in the computer software art. Computer readable recording media may include magnetic media such as hard disks and floppy disks, optical media such as CD-ROM and DVD, magneto-optical media such as floptical disks, and hardware units, such as ROM, RAM, flash memory, and so on, which are intentionally formed to store and perform program instructions. Program instructions may include high-class language codes executable by computers using interpreters, as well as machine language codes likely made by compilers. The hardware units may be configured to function as one or more software modules for performing operations according to embodiments of the present disclosure, and vice versa.

While the present invention has been described above using particular examples, including specific components, by way of limited embodiments and drawings, it is to be appreciated that these are provided merely to aid the overall understanding of the present invention, the present invention is not to be limited to the embodiments above, and various modifications and alterations can be made from the present inventions above by a person having ordinary skill in the technical field to which the present invention pertains. Therefore, the spirit of the present invention must not be limited to the embodiments described herein, and the scope of the present invention must be regarded as encompassing not only the claims set forth below, but also their equivalents and variations.

What is claimed is:

1. A remote control device carried by a user, allowing the user to remotely control a motion of an unmanned aerial vehicle, the remote control device comprising:
    a sensor unit generating sensing data by sensing a motion of the remote control device using at least one sensor,
    a control unit determining a direction of inclination of the remote control device, based on the sensing data, and generating a control command for controlling a motion of an unmanned aerial vehicle using the determined direction of inclination; and
    a communication unit transmitting the control command to the unmanned aerial vehicle,
    wherein the determined direction of inclination is one direction of inclination among a plurality of predetermined directions of inclination, and
    wherein the plurality of directions of inclination include x number of directions of inclination categorized as a state in which a top surface of the remote control device faces upwardly, where x is an integer equal to or greater than 2, and y number of directions of inclination categorized as a state in which the bottom surface of the remote control device 300 faces upwardly, where y is an integer equal to or greater than 2.

2. The remote control device according to claim 1, wherein,
    when the top surface of the remote control device is comprised of x number of areas that are divided from each other without overlapping, the x number of directions of inclination correspond to directions in which the remote control device is inclined upwardly or downwardly of the x number of areas, and
    when the bottom surface of the remote control device is comprised of y number of areas that are divided from each other without overlapping, the y number of directions of inclination correspond to directions in which the remote control device is inclined upwardly or downwardly of the y number of areas.

3. The remote control device according to claim 2, wherein the control unit calculates a direction group of inclination of the remote control device using the sensing data, and generates a control command by further using the determined direction group of inclination, and
    the determined direction group of inclination is one direction group of inclination among a plurality of predetermined direction groups of inclination,
    the plurality of predetermined direction groups of inclination including a first direction group of inclination with respect to a forward direction, a second direction group of inclination with respect to a backward direction, a third direction group of inclination with respect to left, and a fourth direction group of inclination with respect to right.

4. The remote control device according to claim 3, wherein the x number of directions of inclination include a plurality of directions of inclination with respect to the forward direction, a plurality of directions of inclination with respect to the backward direction, a plurality of directions of inclination with respect to the left, and a plurality of directions of inclination with respect to the right,
    the first direction group of inclination being obtained by grouping the plurality of directions of inclination with respect to the forward direction, the second direction group of inclination being obtained by grouping the plurality of directions of inclination respect to the backward direction, the third direction group of inclination being obtained by grouping the plurality of directions of inclination with respect to the left, and the fourth direction group of inclination being obtained by grouping the plurality of directions of inclination respect to the right.

5. The remote control device according to claim 3, wherein the control unit determines the direction of inclination of the remote control device using a first neural network having the sensing data as an input, and generates the control command using the determined direction of inclination and a second neural network having the determined direction group of inclination as an input.

6. The remote control device according to claim 1, wherein the control command comprises a first mode control command for controlling a direction of movement of an unmanned aerial vehicle and a second mode control command for controlling the unmanned aerial vehicle to move along a predetermined geometric flight path.

7. The remote control device according to claim 6, wherein the control unit performs a mode change using at least one direction of inclination among the plurality of directions of inclination, and in response to the mode change, generates one mode control command of the first mode control command and the second mode control command.

8. The remote control device according to claim 6, wherein the first mode control command comprises an ascending command, a descending command, a right movement command, a left movement command, a forward movement command, a backward movement command, a forward-right movement command, a forward-left movement command, a backward-right movement command, and a backward-left movement command, and
the second mode control command comprises a circular movement command, a spiral movement command, a triangular movement command, and a quadrangular movement command.

9. The remote control device according to claim 8, wherein, after the mode change to the second mode, when directions of inclination corresponding to adjacent areas, among x number of directions of inclination, are determined sequentially from a reference position, where x is an integer equal to or greater than 2, the control unit generates a control command for controlling the unmanned aerial vehicle to move along the geometric flight path.

10. The remote control device according to claim 9, wherein the control unit determines a scale of the geometric flight path using a period of time for returning to the reference position after the directions of inclination corresponding to the adjacent areas are determined sequentially from the reference position.

11. The remote control device according to claim 9, wherein the reference position is defined as a direction of inclination corresponding to a horizontal position in a state in which the top surface of the remote control device faces upwardly.

12. The remote control device according to claim 1, wherein the sensing data comprises roll data, pitch data, and z-axis gravity data regarding the motion of the remote control device.

13. The remote control device according to claim 1, wherein the control unit determines at least one of an angle of the direction of inclination and a period of time for which the direction of inclination is maintained, based on the sensing data, and determines a speed of movement of the unmanned aerial vehicle using at least one of the angle of the direction of inclination and the period of time for which the direction of inclination is maintained.

14. A remote control device carried by a user, allowing the user to remotely control a motion of an unmanned aerial vehicle, the remote control device comprising:
a sensor unit generating sensing data by sensing a motion of the remote control device using at least one sensor;
a control unit determining at least one among a direction of inclination of the remote control device, an angle of the direction of inclination, and a period of time for which the direction of inclination is maintained, based on the sensing data, and generating a control command for controlling a motion of an unmanned aerial vehicle using at least one among the direction of inclination, the angle of the direction of inclination, and the period of time for which the direction of inclination is maintained; and
a communication unit transmitting the control command to the unmanned aerial vehicle,
wherein the direction of inclination include x number of directions of inclination categorized as a state in which a top surface of the remote control device faces upwardly, where x is an integer equal to or greater than 2, and y number of directions of inclination categorized as a state in which the bottom surface of the remote control device 300 faces upwardly, where y is an integer equal to or greater than 2.

15. A remote control method performed by a device carried by a user and including a processor, the remote control method comprising:
receiving sensing data generated by sensing a motion of the remote control device using at least one sensor,
determining a direction of inclination of the remote control device, based on the sensing data;
generating a control command for control a motion of an unmanned aerial vehicle using the determined direction of inclination; and
transmitting the control command to the unmanned aerial vehicle,
wherein the determined direction of inclination is one direction of inclination among a plurality of predetermined directions of inclination,
wherein the direction of inclination include x number of directions of inclination categorized as a state in which a top surface of the remote control device faces upwardly, where x is an integer equal to or greater than 2, and y number of directions of inclination categorized as a state in which the bottom surface of the remote control device 300 faces upwardly, where y is an integer equal to or greater than 2.

16. A computer readable program stored in a medium, the program comprising a series of commands for performing the method as claimed in claim 15.

17. A motion control device attached to an unmanned aerial vehicle, comprising:
a communication unit receiving a control command for controlling a motion of an unmanned aerial vehicle from a remote control device carried by a user, and
a controller controlling the motion of the unmanned aerial vehicle based on the control command,
wherein the control command is generated based on a direction of inclination of the remote control device, the direction of inclination of the remote control device being determined using sensing data obtained using at least one sensor provided on the remote control device, and the determined direction of inclination being one direction of inclination among a plurality of predetermined directions of inclination, and wherein the plurality of directions of inclination include x number of directions of inclination categorized as a state in which a top surface of the remote control device faces upwardly, where x is an integer equal to or greater than 2, and y number of directions of inclination categorized as a state in which the bottom surface of the remote control device 300 faces upwardly, where y is an integer equal to or greater than 2.

* * * * *